United States Patent [19]
Hondrea

[11] 3,733,470
[45] May 15, 1973

[54] SLIDE RULE OF GENERAL USE OF POCKET SIZE

[75] Inventor: Iosif Hondrea, Timisoara, Romania

[73] Assignee: Iprofil-"Tennolemn"-Industria Produselor Finite Din Lemn, Timisoara, Romania

[22] Filed: June 21, 1971

[21] Appl. No.: 154,744

[52] U.S. Cl. .............................. 235/70 R, 235/70 C
[51] Int. Cl. ............................................. G06g 1/06
[58] Field of Search ................. 235/70 R, 70 B, 70 C

[56] References Cited

UNITED STATES PATENTS

| | | | |
|---|---|---|---|
| 2,138,879 | 12/1938 | Poole | 235/70 R |
| 2,405,720 | 8/1946 | Snedaker | 235/70 R |
| 1,181,672 | 5/1916 | Keuffel | 235/70 B |

FOREIGN PATENTS OR APPLICATIONS

| | | | |
|---|---|---|---|
| 18,218 | 12/1907 | Great Britain | 235/70 R |

Primary Examiner—Richard B. Wilkinson
Assistant Examiner—John F. Gonzales
Attorney—Karl F. Ross

[57] ABSTRACT

A slide rule has a rule face provided with a number of scales, a reglet whose face is provided with compartment scales for normal slide rule operation, and a cursor or slide is shiftable over the body of the rule and carries an index line for cooperation with the scales of the face. Along one longitudinal side of the body of the rule, a beveled face or trapezoidal flange carries a decimally divided scale which indicates units of length and simultaneously serves, by co-operation with the cursor, to indicate the mantissa of the logarithm of a number indicated on a logarithmically divided scale of the face of the slide rule.

5 Claims, 5 Drawing Figures

PATENTED MAY 15 1973

SLIDE RULE OF GENERAL USE OF POCKET SIZE

FIELD OF THE INVENTION

Our present invention relates to a slide rule and, more particularly, to a so-called pocket-size slide rule having a length-measuring scale as well as a scale for the ordinary calculation of mathematical functions.

BACKGROUND OF THE INVENTION

Slide rules for calculation are, of course, well known and generally comprise a rule body having at least one face provided with a scale, a median slide provided with at least one further scale co-operating with the first scale for the calculation of mathematical functions, and a cursor, slider or window shiftable along the body of the rule and provided with a hairline or other index co-operating with the scale.

Slide rules of this type have the advantage that they can be used for calculation in mathematical functions with a limited degree of accuracy, generally three to four significant figures, and are convenient and simple to manipulate. Lately, slide rules have found increasing significance, because of the improved precision of the scale divisions, the presence of numerous scales and the use of magnifying or other cursors which increase the versatility of the instrument, the precision with which calculated values may be read, the range of application of the instrument and the utility of the device.

Furthermore, such instruments have been provided with special scales, allowing the slide rule to be utilized with convenience and advantage in certain fields such as electrical technology, chemistry, telecommunications, civil engineering and the design of reinforced-concrete structures, time calculations, topography, printing, textiles, machining, navigation and commercial fields of exchange and trade.

The slide rules have been made more useful by the provision of increased numbers of calculation scales and indices and the provision of fixed marks, letters for special purposes, to indicate standard values, etc.

Mention may be made of the provision of slide rules of various length and, for example, it is the common practice to provide a slide rule having a length of 25mm for most engineering and design purposes. Increased precision may be made with slide rules having a length of 500 to 1000mm, although pocket slide rules may also be provided, generally with a length of about 125mm and a reduced precision. Slide rules of the latter type, however, have an advantage in the ease with which they may be carried and manipulated. It may be noted that a slide rule of this type may be provided, along one longitudinal edge, with a beveled face carrying a length scale or measurement and layout and calibrated in millimeters or centimeters. To this end the slide rule may have a trapezoidal configuration with at least one leg of the trapezoid being inclined.

Among the standard scales of a slide rule, i.e. scales which are provided on general-purpose calculating instruments, are the basic C and D scales of logarithmic subdivision on the slider and the rule body, respectively, these scales being identical and having aligned indices. If the number base is represented as X, therefore, the subdivisions of the C and D scales are logarithmic but the scale runs between zero and X. Other common scales are the A and B scales on the slide body and slider respectively, logarithmically subdivided and indicating values zero to $X^2$, the scales being designed to indicate the square of the value on the C or D scale aligned therewith along the index of the cursor. Other typical scales include the reciprocal read scales CI or DI of the slider and body and representing $1/X$. Among the eight basic calculating scales, there should be included the S scale of sexagesimal trigonometric sines representing the arc sine $0.01X$ to $0.1X$, the L scale representing the mantissae of logarithms of the C or D scale ($\log X$) and the scale T representing the sexagesimal trigonometric tangents in the form of arc tan $0.1X$. A K scale ($X^3$) may likewise be provided if there is sufficient room on the face of the instrument.

OBJECT OF THE INVENTION

It is the general object of the present invention to provide an improved slide rule of the character described with increased versatility.

SUMMARY OF THE INVENTION

The slide rule of the present invention comprises, in accordance with conventional practice, an elongated body having a face, longitudinally extending slider shiftable on the body and provided with at least one longitudinally subdivided scale co-operating with a scale on the base of the body, and a cursor movable along the body and having a hairline or other index mark co-operating with scale of the slider and the body. According to the present invention, the body is provided with at least one beveled face along a longitudinal edge which is subdivided into $10^n$ subdivisions in which $n$ is an integer and preferably a power of 10, in units of length, thereby providing a centimeter, millimeter or inch measuring scale. Advantageously, the scales of the body and the slider are so aligned with this measuring scale that the latter indicates the logarithm of X and constitutes the L scale of the rule, a cursor being so constructed and arranged as to enable its index mark to be used for reading the beveled scale.

According to the present invention, the scale has a length of $10^m$ mm where $m$ is an integer, preferably two or three, and is provided along one longitudinal edge with a millimetric scale for the measurement of length and calibrated in both millimeters of length and/or decimal parts of a centimeter, the origin of the measurement scale coinciding with the left-hand index of the other scale of the face of the rule. The millimetric scale on these other scales are so constructed and arranged that the length-measurement scale can also be used as a calculating scale for the direct reading of the decimal value of the mantissa of a logarithm of a number selected on the D scale as located by the cursor or slide reticle.

According to an important feature of the invention, therefore, the slide rule is of "pocket size" and has a scale length of 100mm, the slide rule being of generally trapezoidal cross-section and having the length-measuring scale located along an oblique or inclined flank of the rule.

This scale likewise has a length of 100mm with the origin located in line with the origins of the other scales marked on the face of the slide rule and including at least the C and D scales and preferably also including the A, B, S, T and K scales mentioned earlier, each of these scales having a length of 100mm and an origin or index disposed in line with the origin of the length-measuring scale; the latter, therefore, corresponds to the L scale and serves for the direct reading of the decimal and logarithm mantissa of numbers located by means of the slide reticle on the basic scale D or for reading numbers on scale D corresponding to a logarithm indicated on the length-measuring scale.

The length-measuring scale also enables the direct reading of the mantissa of a decimal cologrithm of a number indicated on the reciprocal scale CI or DI which, as indicated earlier, represents reciprocals of the numbers of the C or D scale, respectively. This added scale is preferably disposed upon the reglet or slide of the rule and must have its index aligned with the left or right-hand indices of the face scales and with the left-hand index or origin of the length-measuring scale. Consequently, one may also read the number corresponding to the cologarithm indicated by the cursor or slider on the length-measuring scale from the CI scale.

In order to increase the length-measuring precision and the accuracey of the mantissa reading, the length-measuring scale is subdivided into principal subdivisions at integral centimeters, into ten intermediate subdivisions/cm, the millimetric intervals and into tertiary half-millimetric subdivisions so that twenty subdivisions are provided per centimeter and the entire length-measuring scale, extending over 100mm, subdivided into halves of millimeters.

According to still another feature of this invention, the cursor or slider is provided with a semicylindrical length having a hairline extending over the entire face of the scale and provided with an extension over at least part of the inclined flank of the rule so that the hairline may extend over the length-measuring scale as well. The cursor or slider preferably consists of a single foil of a transparent synthetic resin, the hairline of which is marked over the entire width of the slider. The lower edge of the foil is twice folded to provide a formation engaging in a groove of the rule along the longitudinal side of the latter opposite the inclined flank; the other side of the slider or cursor foil is also folded twice, once at a right angle inwardly and the second toward the outside at an angle corresponding to the angle of this flank to overlie the millimetric scale. The guide of the upper edge of the slide is constituted by a doubly bowed spring fixed at its center to a foil and received in an upper groove of the rule between the millimetric scale and the face.

The invention also includes a rule having a scale length of 100mm and provided with a length-measuring scale of this length subdivided into millimeters or half-millimeters with an origin aligned with those of the scales of the face. In this case, the same principles apply as elucidated for the 100mm scale.

In addition, it has been found to be advantageous to provide the slide rule, along the longitudinal side opposite the inclined flank, with a P scale representing the Pythagorean relationship $\sqrt{1-X^2}$. The scale should also include an exponential scale $e^x$ corresponding to the conventional $LL_3$ scale. A slide rule of the latter type has calculating possibilities far surpassing those which are now possible with conventional pocket-size slide rules.

DESCRIPTION OF THE DRAWING

The above and other objects, features and advantages of the present invention will become more readily apparent from the following description reference being made to the accompanying drawing in which.

SPECIFIC DESCRIPTION

Figure 1:
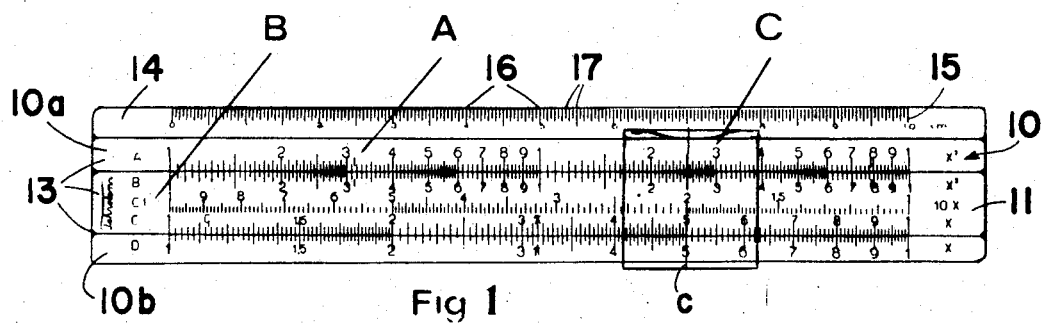
FIG. 1 is a plan view of the face of a miniature slide rule embodying the present invention.
Figure 2:
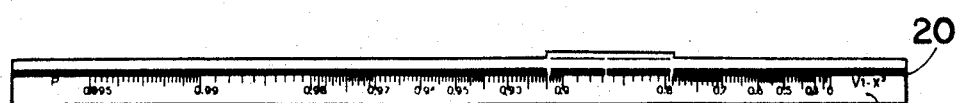
FIG. 2 is a view of the right lateral face of the rule.
Figure 3:
FIG. 3 is an elevational view of the back of the reglet or slider.

As illustrated in FIGS. 1–3, the slide rule basically comprises a body A having a scale face 10 and a trapezoidal cross section, a reglet or slide B and a cursor or slider C with a hairline c forming a reticle for indicating numerical values on the rule. The face 10 has two portions 10a and 10b corresponding to the top and bottom of the rule, respectively, and provided with scales A and D. The face 11 of the slider B carries the scales B, CI and C while the rear face 12 of the slide is provided with the scales S, $LL_3$ and T respectively. The scale-carrying faces are each formed of milk-white celluloid sheets as represented at 13 cemented to the pearwood bodies of the rule and the slide respectively.

On the inclined face 14, there is provided a millimetric scale 15 with principal subdivisions 16 at centimeter intervals and intermediate subdivisions of millimeter intervals as represented at 17. Between each of these intermediate subdivisions, there is a tertiary subdivision at half-millimeter intervals. On the opposite side of the rule at 18, there is provided a P scale as will be described in greater detail hereinafter. The slider C is described in greater detail in connection with FIGS. 4 and 5 and has extensions enabling the hairline c to indicate on the P scale and the length-measuring scale respectively.

The scales have a length of 100mm and origins coinciding at the left side of the rule so that the length-measuring or millimetric scale represents log X and can be used for the direct measurement of length, scale A represents the square of a number on scale D and represents $X^2$, scale B is identical to scale A and represents the square of numbers of scale C, scale CI is the reciprocal of scale C and represents 1/X, scales C and D represent the basic X values and the scale P represents the value $\sqrt{1-X^2}$. On the slide B, the sexagesimal scale S represents the arcsine 0.1X and may be provided, as shown, with complementary values to indicate the cosine, the scale $LL^3$ represents the value $e^x$ to the X and has the value e at its origin while being divided exponentially in numerical value of 2.718 to 2.2000, and a sexagesimal scale T representing the arctangent 0.1X; the latter scale may be provided as well with the values of co-tangents.

It has been found to be advantageous to provide the following indices for the rule:

The origins 1 of the A, B, C, D scales; $\pi$, as 3.14; C as $\sqrt{4/\pi} = 1.128$ on scale C; and e as 2.718 in the origin of scale $LL_3$.

Figures 4, 5:
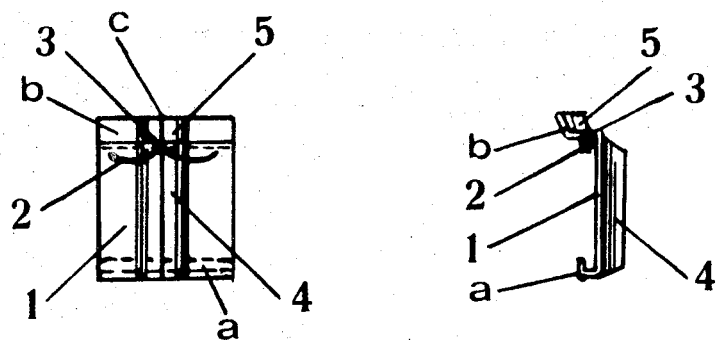
FIG. 4 is a view of the face of the slider or cursor showing the extended semicylindrical lens.
FIG. 5 is a side view thereof.

The slide of the rule, shown in FIGS. 4 and 5, consists of a foil 1, of transparent thermoplastics, on which the reticle c is traced; the lower edge of the foil is twice folded inwards, at right angles, to achieve the link a, which will glide inside the lower groove 20 of the body while the upper edge of the foil is twice folded, first towards inside, at right angle, then towards outside at an angle corresponding to the slope of the millimetric-scale plane thus constituting a narrow prolongation strip $b$, on which the reticle $c$ is extended, thus permitting reading of the mantissae from the millimetric scale divisions.

Inside the slide, at its upper part, a double bow metal spring 2, of steel strip, has its middle fixed to the foil by means of a rivet 3. The spring has dimensions adequate for gliding within the upper groove of the rule. The slide may equally be provided with a semi-cylindric extension lens 4 and/or a separate extension lens 5 on the prolongation strip $b$.

With the help of the known scales and indices of the rule mentioned in the above, the usual calculations may be carried out.

The rule equally allows for numerous further calculations to be performed, as shown in the examples which follow:

1. To find the mantissa of log 235, the slide reticle marks the division 235 on the basic scale D, and the same reticle indicates on the upper millimetric scale, the FIG. 371; thus log 235 = 2.371, the characteristic 2 being mentally supplied.

2. Inversely, to find the number $x$ corresponding to the decimal logarithm $\overline{4}.512$, the mantissa 512 is marked by the slide reticle on the millimetric scale, while on the basic scale D, the same reticle marks 325; consequently $X = 0.000325$.

3. To find the mantissa of colg. 235, the reglet is brought to the position in which its origin coincides with that of the rule; the slide reticle then marks the division 235 on the basic CI red reverse or reciprocal scale and the same reticle indicates the mantissa on the upper millimetric scale : 629; thus, colg. 235 = $\overline{3}.629$. Inversely, marking the cologarithm mantissa on the millimetric scale, one may find directly the corresponding number on the reciprocating basic scale CI.

4. To raise to a higher power a number less than $e = 2.718$, by means of scale $LL_3$, the procedure is as follows: Let us calculate, for instance, $1.45^{2.82}$. As the FIG. 1.45 does not appear on the exponential scale $LL_3$, the given number X will be multiplied and divided by an integer $n$, raised to the respective power, and chosen, so that $n > 2.718$. To simplify the matter, let us take for this case, $n = 10$. We may then write:
$1.45^{2.82} = (10 \times 1.45)^{2.82}/10^{2.82} = 14.5^{2.82}/10^{2.82} = 1875/658 = 2.85$
the numerator and the denominator being calculated by means of the exponential scale $LL_3$ and the basic scales C and D of the reglet and the rule.

For the numerator : the reglet is pushed in, turned so as to have the exponential scale $LL_3$ on the rule face, and the origin division 1 of the basic scale D is marked by means of the slide reticle. The reglet is then shifted to the left, so that the FIG. 14.5 on the scale $LL_3$ should be at the height of the origin division 1 of the basic scale D. The slide is then shifted to the right, marking with the reticle the number 2.82 on the basic scale D, and the figure corresponding to the denominator 1875, is read at the slide article, on the exponential scale $LL_3$.

The division 1875/658 is effected by means of the basic scales C and D, the final result being 2.85.

Instead of multiplying by 10 at the given power, any convenient integer may be chosen. For the case $1.15^{2.35}$ we may choose, for instance, 3 and write:
$1.15^{2.35} = (3 \times 1.15)^{2.35}/3^{2.35} = 3.45^{2.35}/3^{2.35} = 18.35/\overline{1}3.2 = 1.39$ Acting as above, and using the exponential scale $LL_3$ and the basic scale D, we find 18.35 / 13.2, which, with the help of the basic scales C and D gives the result 1.39.

By this mode of calculation, the exponential $e^x$ scale $LL_3$ replaces efficiently the K scale of cubes $X^3$ as well as the exponential scales $LL_2$, $LL_1$ and $LL_0$, the function of $e^{0.1x}$ assuming values ranging from 1.1 to 3; $e^{0.01x}$ ranging from 1.01 to 1.11 and $e^{0.001x}$ ranging from 1.001 to 1.01.

Moreover, the exponential scale $LL_3$ permits, in the same manner, to raise a number to a negative power. Thus, in order to perform the operation:
$3^{-2.35} = 1/3^{2.35}$, we may write directly, according to what was said above 1/13.2, and get by division the final result 0.757.

Similarly:
$1.15^{-2.35} = 3^{2.35}/3.45^{2.35} = 13.2/\mathbf{18.35} = 0.720$

The scale $LL_3$ may thus equally replace the scales $LL_{03}$, $LL_{02}$, $LL_{01}$ and $LL_{00}$, exponential $e^{1-x}$; $e^{1-0.1x}$; $e^{1-0.01x}$ and $e^{-0.001x}$ of the known slide rules.

With the calculating possibilities expounded above, the pocket slide rule of 100mm divided length, of the example given, constitutes a slide rule of general use, permitting a wide range of operations.

The slide rule according to the invention has the following advantages: in spite of being provided with two more calculating scales, and offering many additional possibilities of calculation, it retains the size advantage of known rules of limited length being as easy to carry and easier to handle; and with its many scales, the new slide rule yields much higher performances than the similar known rules, being able to perform the following operations : multiplication, division, squaring, extraction of square root, deriving the reciprocate values of the numbers and of their squares, calculation of decimal logarithms and cologarithms and reversely, of the Pythagorean values $\sqrt{1 - X^2}$, of the trigonometric functions sin (cos), tg (ctg), as well as of the sexagesimal and centesimal arcs of a circle, direct solution of right triangles and of any kind of triangles, solution of equations of the second degree, natural logarithms of numbers and the reverse, raising a number to an arbitrary power and extraction of the root of an arbitrary degree, forming of exponential proportions.

We claim:

1. A slide rule having an effective scale length of substantially 100 mm and comprising an elongated rule body having a scale face, an elongated slide receivable in said body and shiftable relatively thereto while having a rule face, and a cursor provided with a reticle extending over said faces, said faces being marked with complementary slide-rule calculating scales including a D scale on said scale face having an origin along at least one end of said rule and a length of substantially 100 mm, said body being further formed with a longitudinally extending flank marked with a millimetric length-measuring scale of a length of substantially 100 mm subdivided into millimeter divisions with an origin coinciding with that of said D scale for indicating logarithmic mantissas of numbers selected on said D scale, said cursor having an index along an edge thereof overlying said flank for alignment with divisions of said length-measuring scale, a C scale identical to said D scale marked on said rule face, a CI scale on said rule face representing reciprocals of values on said C and D scales whereby said length-measuring scale represents decimal cologarithms of numerical values on said CI scale, and as the sole log-log scale, an $LL_3$ scale marked on said slide with the value e substantially at the origin of said C scale.

2. The slide rule defined in claim 1 wherein said length-measuring scale is subdivided at half-millimeter intervals.

3. The slide rule defined in claim 2 wherein said cursor is provided with a semicylindrical lens having said reticle and extending over said length-measuring scale.

4. The slide rule defined in claim 3 wherein said cursor is formed from a single foil of transparent thermoplastic material bent to engage said body and having an extension overlying said length-measuring scale, said cursor further comprising a double-bowed spring affixed to said foil and engaging said body.

5. The slide rule defined in claim 4 wherein said calculating scales further include an A scale representing $X^2$ on said scale face, a B scale representing $X^2$ on said rule face, an S scale representing arcsine $0.1X$ on a further face of said rule, and a T scale representing arctan $0.1X$ on said other face of said rule, where said C and D scales represent a value X and said length-measuring scale represents log X.

* * * * *